United States Patent [19]
Preiss

[11] Patent Number: 5,836,643
[45] Date of Patent: Nov. 17, 1998

[54] VEHICLE ROOF

[75] Inventor: Michael Preiss, Vaihingen, Germany

[73] Assignee: Dr. Ing. h.c.F. Porsche AG, Weissach, Germany

[21] Appl. No.: 951,167

[22] Filed: Oct. 15, 1997

Related U.S. Application Data

[63] Continuation of Ser. No. 620,542, Mar. 25, 1996, abandoned.

[30] Foreign Application Priority Data

Mar. 24, 1995 [DE] Germany .................. 195 10 822.1

[51] Int. Cl.⁶ .................................................. B60J 7/22
[52] U.S. Cl. ................................ 296/217; 296/180.1
[58] Field of Search ............................ 296/217, 180.1, 296/208; 454/129

[56] References Cited

U.S. PATENT DOCUMENTS

| | | |
|---|---|---|
| 4,867,503 | 9/1989 | Luksch et al. ............... 296/217 |
| 5,052,745 | 10/1991 | Preiss .......................... 296/217 |
| 5,544,934 | 8/1996 | Murkett et al. ............. 296/217 X |

FOREIGN PATENT DOCUMENTS

| | | |
|---|---|---|
| 880703 | 6/1953 | Germany ................ 296/217 |
| 1 480 470 | 9/1969 | Germany . |
| 23 57 906 | 6/1975 | Germany . |
| 3035230 | 3/1982 | Germany ................ 296/217 |
| 42 03 229 C2 | 8/1983 | Germany . |
| 3420418 | 12/1985 | Germany ................ 296/217 |
| 0 362 028 A1 | 4/1990 | Germany . |
| 3925808 | 2/1991 | Germany ................ 296/217 |
| 4033027A1 | 4/1992 | Germany . |
| 4126568 | 2/1993 | Germany ................ 296/217 |
| 4203229A1 | 8/1993 | Germany . |

*Primary Examiner*—Dennis H. Pedder
*Attorney, Agent, or Firm*—Evenson, McKeown, Edwards & Lenahan, P.L.L.C.

[57] ABSTRACT

A vehicle roof has a first pivotable roof section, adjacent to a windshield frame, and a following roof opening. To avoid booming in the passenger compartment when driving, at least one upwardly projecting air baffle of limited width is provided on the outside of the first roof section.

23 Claims, 3 Drawing Sheets

VEHICLE ROOF

This application is a continuation of application Ser. No. 08/620,542 filed on Mar. 25, 1996, now abandoned.

BACKGROUND AND SUMMARY OF THE INVENTION

The invention relates to a vehicle roof, with a first roof section located adjacent to a windshield frame and a roof opening adjacent to said section.

A vehicle roof of the type referred to above is based on the general disclosure of German Patent Document DE 42 03 229 C2. In this arrangement, a first roof section is provided adjacent to the windshield frame and is pivotable around an anterior approximately horizontal transverse axis, said section being movable upward from a first operating position in which it is approximately flush with the adjacent outer skin, into a deployed second operating position. In the deployed operating position and in an open roof section located behind it, the first roof section acts as a wind deflector.

However, it has been found that the deployed first roof section is not capable of preventing the low-frequency coherent air vibrations, also referred to as "booming," that occur in the passenger compartment when driving with the roof open.

An object of the invention is to take measures in a first deployable roof section located adjacent to the windshield frame such that the disturbing pulsating vibrations called "booming" are largely eliminated in the passenger compartment when driving.

According to the invention this object is achieved by an arrangement wherein at least one upwardly projecting air baffle of limited width is provided on a side of the first roof section facing away from passenger compartment.

The primary advantages achieved with the invention consist in the fact that providing an additional air baffle on the outside of the first roof section largely eliminates booming in the passenger compartment when driving with the vehicle roof open. The air baffle, also called an auxiliary spoiler, is either made integral with the first roof section or is formed by a shaped part in the form of a strip that is mounted on and connected rigidly to the roof section beneath.

The air baffle has a limited width and is preferably located adjacent to a central lengthwise plane B—B of the vehicle. The air baffle is inexpensive to manufacture and functions well.

Other objects, advantages and novel features of the present invention will become apparent from the following detailed description of the invention when considered in conjunction with the accompanying drawings.

DETAILED DESCRIPTION OF THE DRAWINGS

Figure 1:
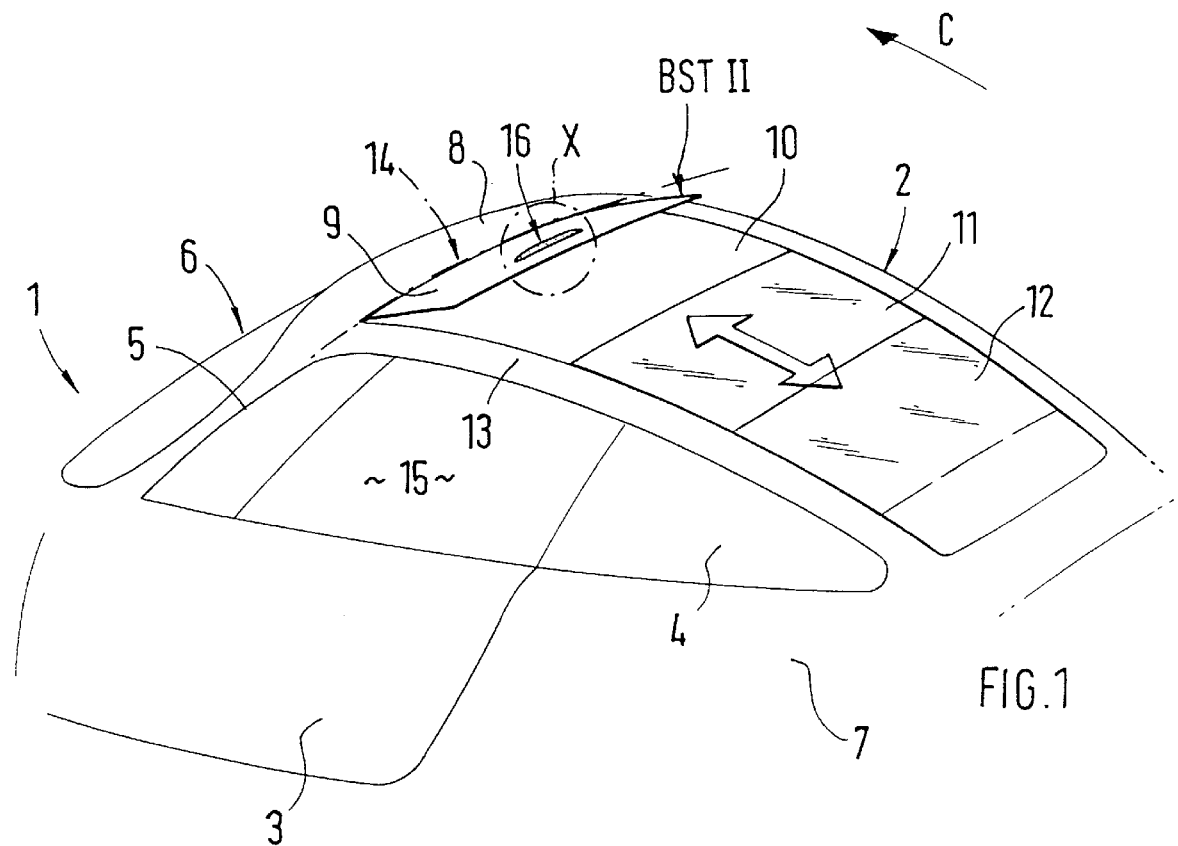
FIG. 1 is a partial schematic view looking laterally from above at a vehicle roof of a motor vehicle with a first roof section located adjacent to a windshield frame and a roof opening behind said section, constructed according to a preferred embodiment of the invention.
Figure 2:
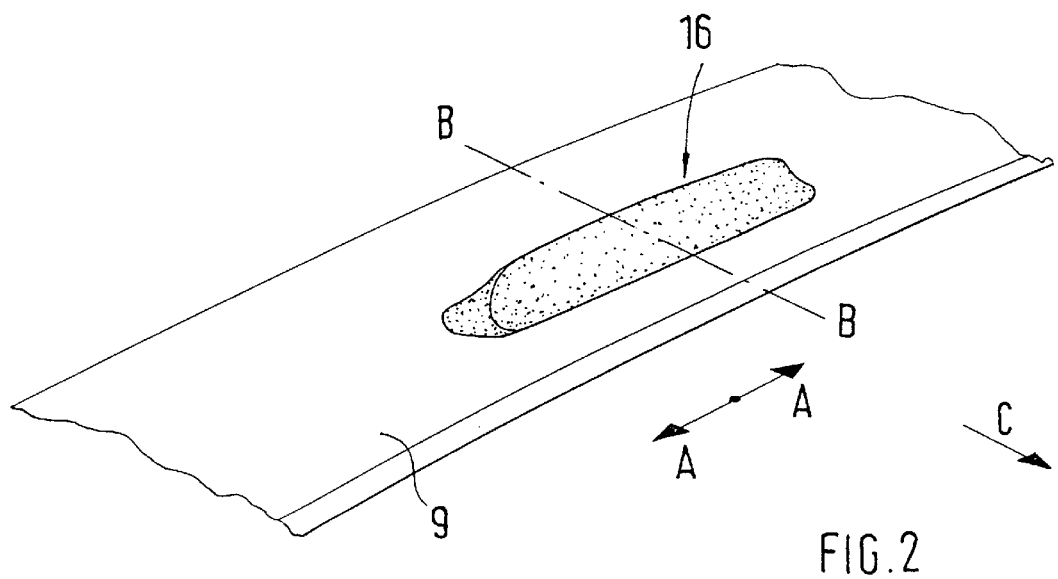
FIG. 2 shows a detail X in FIG. 1 on an enlarged scale.

FIG. 1 shows a partial area of an automobile 1 with a vehicle roof 2, side doors 3, rear side windows 4, a windshield 6 mounted in a windshield frame 5, and rear side parts 7.

Vehicle roof 2 comprises a first roof section 9 extending adjacent to an upper transverse section 8 of windshield frame 5 and a roof opening 10 adjacent to said first section, said opening being closable or openable by means of at least one additional roof section.

In the embodiment shown, roof opening 10 is covered by a second displaceable roof section 11 and a third roof section 12 located behind section 11, with roof section 11 being movable over or under fixed rear roof section 12.

Roof opening 10 is delimited by a fixed roof frame 13. Roof opening 10 can also have a removable roof section or a sliding roof section associated with it.

Figure 3:
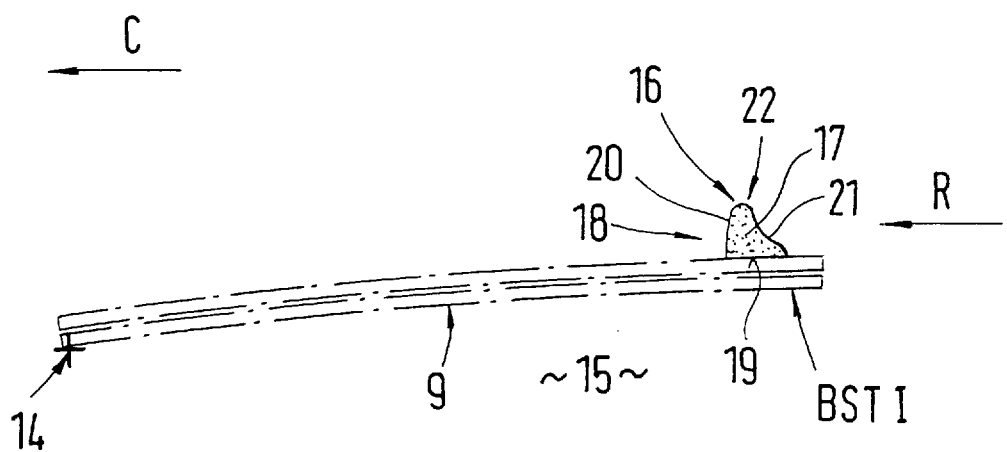
FIG. 3 is a section along line B—B in FIG. 2.

First roof section 9, with a relatively short lengthwise extent, is displaceable around an anterior transverse approximately horizontal pivoting axis 14 from an operating position BST I in which it is approximately flush with the outer skin, into a deployed operating position BST II, and vice versa (FIG. 3).

In deployed operating position BST II in which it extends diagonally upward and rearward, and with roof opening 10 at least partially open, first roof section 9 acts as a wind deflector.

To avoid or suppress distrubing booming in passenger compartment 15 when driving, an air baffle 16 projecting upward on the side of the first roof section 9 facing away from passenger compartment 15 is provided according to the invention. Air baffle 16, according to a first design not shown in greater detail, is made integral with first roof section 9, made of glass or plastic; first roof section 9 has a local projection or molding directed outward for this purpose.

According to another embodiment, provision is made such that air baffle 16 is formed by a mounted profiled strip-shaped part 17 made of rubber or plastic, said part extending in transverse direction A—A of the vehicle and permanently connected to roof section 9 beneath same (by gluing, for example). Air baffle 16 preferably extends adjacent to a central lengthwise plane B—B of the vehicle.

Figure 4:
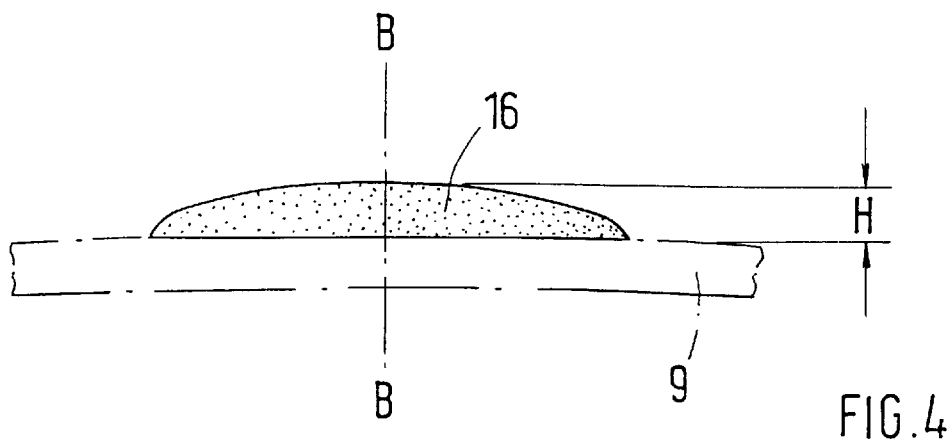
FIG. 4 is a view looking in the direction of arrow R in FIG. 3.

However, it is also contemplated, instead of a centrally mounted air baffle 16 of limited width, to provide on first roof section 9 an air baffle 16 located externally and laterally. Air baffle 16 has a width of approximately 100±50 mm and a maximum height of approximately 15±10 mm. In the embodiment shown, air baffle 16 has a profile shape that differs over its transverse extent. The height of the profile is greatest in central lengthwise plane B—B and drops off to both sides (FIG. 4). Air baffle 16 can also have a constant cross section along its transverse extent, however, according to other contemplated embodiments.

Air baffle 16, according to FIG. 3 and looking in driving direction C, is provided in a central or rear area 18 of the lengthwise extent of first roof section 9. That is, the baffle 16 is disposed behind the axial half way extent of the roof section 9.

Air baffle 16, viewed in cross section, is approximately triangular in shape, with a first side 19 abutting the outside of roof section 9. The other two sides 20, 21 are connected together at the end facing away from first side 19 by a radial transitional area 22. The other two sides 20, 21 that extend in the upright direction are rectilinear or bent slightly (convexly or concavely).

Figure 4A:
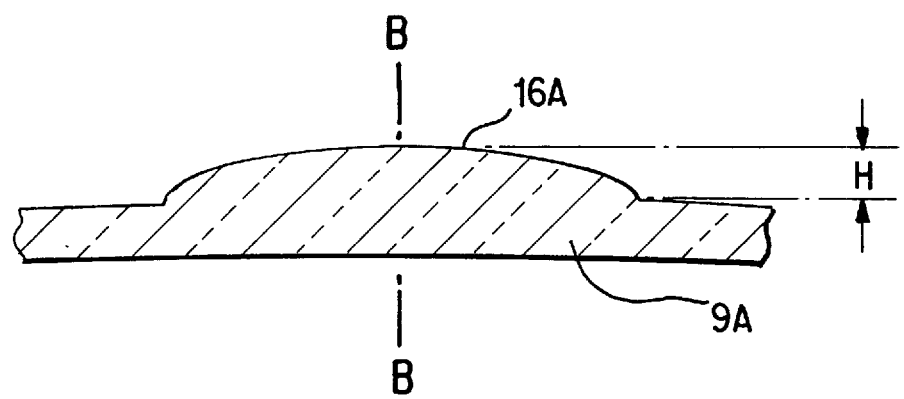
FIG. 4A is a view similar to FIG. 4 showing an embodiment with a one piece baffle and roof section.

FIG. 4A schematically depicts a one piece roof section 9A and baffle 16A.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Vehicle roof assembly comprising:
    a first roof section made of glass disposed adjacent a vehicle windshield frame, said first roof section being selectively movable between a lower position approximately flush with adjacent vehicle exterior surfaces and an upper wind deflecting position,
    a roof opening disposed rearwardly of said first roof section,
    and an air baffle immovably disposed on an exterior side of said first roof section to extend away from the exterior side, said air baffle extending laterally over only a portion of the width of the first roof section and being located at a position spaced between and spaced from front and rear edges of the first roof section, said air baffle serving to minimize air booming in a passenger compartment when said roof opening is open during forward driving of a vehicle with said roof assembly.

2. Vehicle roof assembly according to claim 1, wherein said first roof section is mounted for pivotal movement at its side adjacent the windshield frame.

3. Vehicle roof assembly according to claim 1, wherein the air baffle is made in one piece with the first roof section.

4. Vehicle roof assembly according to claim 2, wherein the air baffle is made in one piece with the first roof section.

5. Vehicle roof assembly according to claim 1, wherein the air baffle is formed by a mounted profiled strip-shaped part that extends transversely with respect to the vehicle and is permanently attached to the first roof section disposed beneath the strip shaped part.

6. Vehicle roof according to claim 2, wherein the air baffle is formed by a mounted profiled strip-shaped part that extends transversely with respect to the vehicle and is permanently attached to the first roof section disposed beneath the strip shaped part.

7. Vehicle roof according to claim 1, wherein the air baffle extends adjacent to a central lengthwise plane of the vehicle roof.

8. Vehicle roof assembly according to claim 2, wherein the air baffle extends adjacent to a central lengthwise plane of the vehicle roof.

9. Vehicle roof assembly according to claim 1, wherein the air baffle has a width of approximately 100 mm±50 mm.

10. Vehicle roof assembly according to claim 2, wherein the air baffle has a width of approximately 100 mm±50 mm.

11. Vehicle roof according to claim 6, wherein the air baffle has a width of approximately 100 mm±50 mm.

12. Vehicle roof according to claim 8, wherein the air baffle has a width of approximately 100 mm±50 mm.

13. Vehicle roof assembly according to claim 1, wherein the air baffle has a maximum height of approximately 15 mm±10 mm.

14. Vehicle roof assembly according to claim 2, wherein the air baffle has a maximum height of approximately 15 mm±10 mm.

15. Vehicle roof assembly according to claim 6, wherein the air baffle has a maximum height of approximately 15 mm±10 mm.

16. Vehicle roof assembly according to claim 8, wherein the air baffle has a maximum height of approximately 15 mm±10 mm.

17. Vehicle roof assembly according to claim 9, wherein the air baffle has a maximum height of approximately 15 mm±10 mm.

18. Vehicle roof assembly according to claim 2, wherein the air baffle, viewed in a lengthwise direction, is mounted in a central rear area of a lengthwise extent of the first roof section.

19. Vehicle roof assembly according to claim 1, wherein said air baffle is disposed in a rear half of the first roof section.

20. Vehicle roof assembly according to claim 19, wherein said air baffle has its greatest height in a central region and curves downwardly from the central region to respective opposite lateral sides of the air baffle.

21. Vehicle roof assembly according to claim 20, wherein the air baffle has an approximately triangular shape with a substantially flat front surface extending substantially perpendicularly to an adjacent surface of the first roof section and a sloped rear surface extending from the top of the front surface rearwardly and downwardly to an adjacent surface of the first roof section.

22. Vehicle roof assembly according to claim 1, wherein the air baffle has an approximately triangular shape with a substantially flat front surface extending substantially perpendicularly to an adjacent surface of the first roof section and a sloped rear surface extending from the top of the front surface rearwardly and downwardly to an adjacent surface of the first roof section.

23. Vehicle roof assembly comprising:
    a first roof section made of one of glass and plastic, having front and rear edges, disposed adjacent a vehicle windshield frame, said first roof section being selectively movable between a lower position approximately flush with adjacent vehicle exterior surfaces and an upper wind deflecting position,
    a roof opening disposed rearwardly of said first roof section,
    a second roof section movable to open or cover said roof opening, said rear edge of said first roof section being juxtaposed adjacent a front edge of the second roof section in the lower position to close the roof opening,
    and an air baffle immovably disposed on said first roof section at a position located spaced between and spaced from the front and rear edges of said first roof section, said air baffle extending laterally over only a portion of the width of the first roof section and projecting upwardly of adjacent surrounding roof surface sections of the first roof section when said first roof section is in said upper position to thereby serve to minimize air booming in a passenger compartment through said roof opening when said first roof section is in said upper position during forward driving of a vehicle with said roof assembly.

* * * * *